United States Patent
Mironets et al.

(10) Patent No.: US 12,269,110 B2
(45) Date of Patent: Apr. 8, 2025

(54) FIELD-ASSISTED FRICTION STIR ADDITIVE MANUFACTURING

(71) Applicant: GOODRICH CORPORATION, Charlotte, NC (US)

(72) Inventors: Sergey Mironets, Philadelphia, PA (US); Tahany El-Wardany, Vernon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 72 days.

(21) Appl. No.: 18/160,223

(22) Filed: Jan. 26, 2023

(65) Prior Publication Data
US 2024/0253149 A1 Aug. 1, 2024

(51) Int. Cl.
  *B23K 20/12* (2006.01)
  *B33Y 10/00* (2015.01)
  *B33Y 30/00* (2015.01)
  *B33Y 50/02* (2015.01)

(52) U.S. Cl.
  CPC ........ *B23K 20/122* (2013.01); *B23K 20/1235* (2013.01); *B23K 20/128* (2013.01); *B33Y 10/00* (2014.12); *B33Y 30/00* (2014.12); *B33Y 50/02* (2014.12)

(58) Field of Classification Search
  CPC ...... B23K 20/122–128; B23K 20/1235; B33Y 10/00; B33Y 30/00; B33Y 50/02
  USPC ................................. 228/112.1, 2.1
  See application file for complete search history.

(56) References Cited

U.S. PATENT DOCUMENTS

| | | | | |
|---|---|---|---|---|
| 2011/0266330 A1* | 11/2011 | Bruck | .................. | B23K 20/128 228/112.1 |
| 2012/0009339 A1* | 1/2012 | Creehan | ............ | B23K 20/1245 427/180 |
| 2012/0279441 A1* | 11/2012 | Creehan | .................. | C23C 26/00 228/2.1 |
| 2014/0130736 A1* | 5/2014 | Schultz | .............. | B23K 20/1215 118/600 |
| 2014/0174344 A1* | 6/2014 | Schultz | .................. | B05C 11/00 228/2.1 |
| 2016/0167156 A1* | 6/2016 | Burke | .................. | B23K 11/309 219/76.12 |
| 2017/0216962 A1* | 8/2017 | Schultz | .................. | B29C 41/36 |
| 2017/0282283 A1* | 10/2017 | Burke | ................ | B23K 11/0006 |
| 2018/0354058 A1* | 12/2018 | Twelves, Jr. | ....... | B23K 20/1215 |

(Continued)

FOREIGN PATENT DOCUMENTS

| CA | 2970313 C | * 10/2021 | ......... B23K 11/0006 |
|---|---|---|---|
| CN | 105215540 | 1/2016 | |

(Continued)

OTHER PUBLICATIONS

European Patent Office, European Search Report dated Jul. 9, 2024 in Application No. 24154221.6.

*Primary Examiner* — Kiley S Stoner
(74) *Attorney, Agent, or Firm* — SNELL & WILMER L.L.P.

(57) ABSTRACT

A method of forming a metal workpiece is disclosed herein. The method includes applying an electrical current through a feedstock material, applying a vertical axis force to the feedstock material; applying a rotational force to the feedstock material, and producing a metallic component from the feedstock material based on the electric current, the vertical axis force, and the rotational force.

17 Claims, 6 Drawing Sheets

(56) References Cited

U.S. PATENT DOCUMENTS

| | | | | |
|---|---|---|---|---|
| 2019/0176400 A1* | 6/2019 | Petros | .................... | B33Y 30/00 |
| 2023/0182228 A1* | 6/2023 | Burke | ................ | B23K 11/0013 |
| 2024/0024950 A1* | 1/2024 | Lustig | .................... | B22F 10/22 |

FOREIGN PATENT DOCUMENTS

| | | | | |
|---|---|---|---|---|
| CN | 105556008 A * | 5/2016 | ......... | B29C 48/0022 |
| CN | 105921878 A * | 9/2016 | ........... | B23K 20/123 |
| CN | 105965152 A * | 9/2016 | | |
| CN | 106041292 A * | 10/2016 | ........... | B23K 20/122 |
| CN | 106181021 A * | 12/2016 | | |
| CN | 205927497 U * | 2/2017 | | |
| CN | 107199395 A * | 9/2017 | ........... | B23K 20/123 |
| CN | 107755701 A * | 3/2018 | .............. | B22F 3/115 |
| CN | 106041292 B * | 6/2018 | ........... | B23K 20/122 |
| CN | 108890119 A * | 11/2018 | | |
| CN | 108890120 A * | 11/2018 | | |
| CN | 109261962 | 1/2019 | | |
| CN | 112496522 | 5/2021 | | |
| CN | 114147340 A * | 3/2022 | | |
| CN | 113351984 | 7/2022 | | |
| CN | 113458585 B * | 12/2022 | | |
| CN | 116118182 A * | 5/2023 | | |
| CN | 116944658 A * | 10/2023 | | |
| CN | 117381135 A * | 1/2024 | | |
| EP | 1430986 A1 * | 6/2004 | ........... | B23K 20/122 |
| EP | 3064306 A1 * | 9/2016 | ........ | B23K 20/1255 |
| EP | 3424708 A1 * | 1/2019 | ........... | B29C 64/118 |
| EP | 3459710 A1 * | 3/2019 | ........... | B29C 64/118 |
| WO | 2010041945 | 4/2010 | | |
| WO | WO-2019182989 A1 * | 9/2019 | .............. | B22F 10/20 |
| WO | 2022068108 | 4/2022 | | |

* cited by examiner

FIELD-ASSISTED FRICTION STIR ADDITIVE MANUFACTURING

FIELD

The present disclosure generally relates to the utilization of feedstock material for producing aerospace components via additive manufacturing processes and more particularly to methods of heating the feedstock material during a friction stir additive manufacturing process utilizing an electrical current.

BACKGROUND

During manufacture of a part or component, a coating may be formed over a surface of the part or component. The coating may be formed from various different materials such as polymers or metals. Sometimes, a coating formed from a specific metal is used to improve the performance of a part made from a different metal.

SUMMARY

A method of forming a metal workpiece is disclosed herein. The method includes applying an electrical current to a feedstock material; applying a vertical axis force to the feedstock material; applying a rotational force to the feedstock material; and producing a metallic component from the feedstock material based on the electric current, the vertical axis force, and the rotational force.

In various embodiments, the electrical current is at least one of a direct electrical current or an alternating electrical current. In various embodiments, a first end of an electrical current circuit supplying the electrical current is applied to the feedstock material and a second end of the electrical current circuit is applied to a substrate. In various embodiments, the substrate is comprised of a first material and the feedstock material is comprised of a second material and the first material is the same as the second material. In various embodiments, the substrate is comprised of a first material and the feedstock material is comprised of a second material and the first material is different material than the second material.

In various embodiments, the feedstock material is a metal alloy with a hardness greater than a defined grade. In various embodiments, producing the metallic component from the feedstock material further includes preforming a first deposition process to form a first layer on a substrate; and preforming a second deposition process to form a second layer over the first layer. In various embodiments, the first layer is formed to a first thickness and the second layer is formed to a second thickness. In various embodiments, the first deposition process is a stir friction welding process.

Also disclosed herein is a system including an electric current source; a force mechanism; a rotating tool; a controller; and a tangible, non-transitory memory configured to communicate with the controller, the tangible, non-transitory memory having instructions stored thereon that, in response to execution by the controller, cause the controller to perform operations including: commanding the electric current source to apply an electrical current to a feedstock material; commanding the force mechanism to apply a vertical axis force to the feedstock material; commanding the rotating tool to apply a rotational force to the feedstock material; and producing a metallic component from the feedstock material based on the electrical current, the vertical axis force, and the rotational force.

In various embodiments, the electrical current is at least one of a direct electrical current or an alternating electrical current. In various embodiments, a first end of an electrical current circuit supplying the electrical current from the electric current source is applied to the feedstock material and a second end of the electrical current circuit is applied to a substrate on which the metallic component is produced. In various embodiments, the substrate is comprised of a first material and the feedstock material is comprised of a second material and the first material is the same as the second material. In various embodiments, the substrate is comprised of a first material and the feedstock material is comprised of a second material and the first material is different material than the second material. In various embodiments, the feedstock material is a metal alloy with a hardness greater than a defined grade.

Also disclosed herein is a method forming a metal workpiece. The method includes receiving a feedstock material comprising a first material; applying an electrical current to the feedstock material to heat the feedstock material to a first temperature; applying a vertical axis force to the feedstock material; applying a rotational force to the feedstock material, an application of the vertical axis force and the rotational force causes the feedstock material to heat to a second temperature, the second temperature is higher than the first temperature; and producing a metallic component from the feedstock material.

In various embodiments, the electrical current is at least one of a direct electrical current or an alternating electrical current. In various embodiments, a first end of an electrical current circuit supplying the electrical current from an electric current source is applied to the feedstock material and a second end of the electrical current circuit is applied to a substrate on which the metallic component is produced. In various embodiments, the substrate is comprised of a second material and the first material is the same as the second material. In various embodiments, the substrate is comprised of a second material and the first material is different material than the second material.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
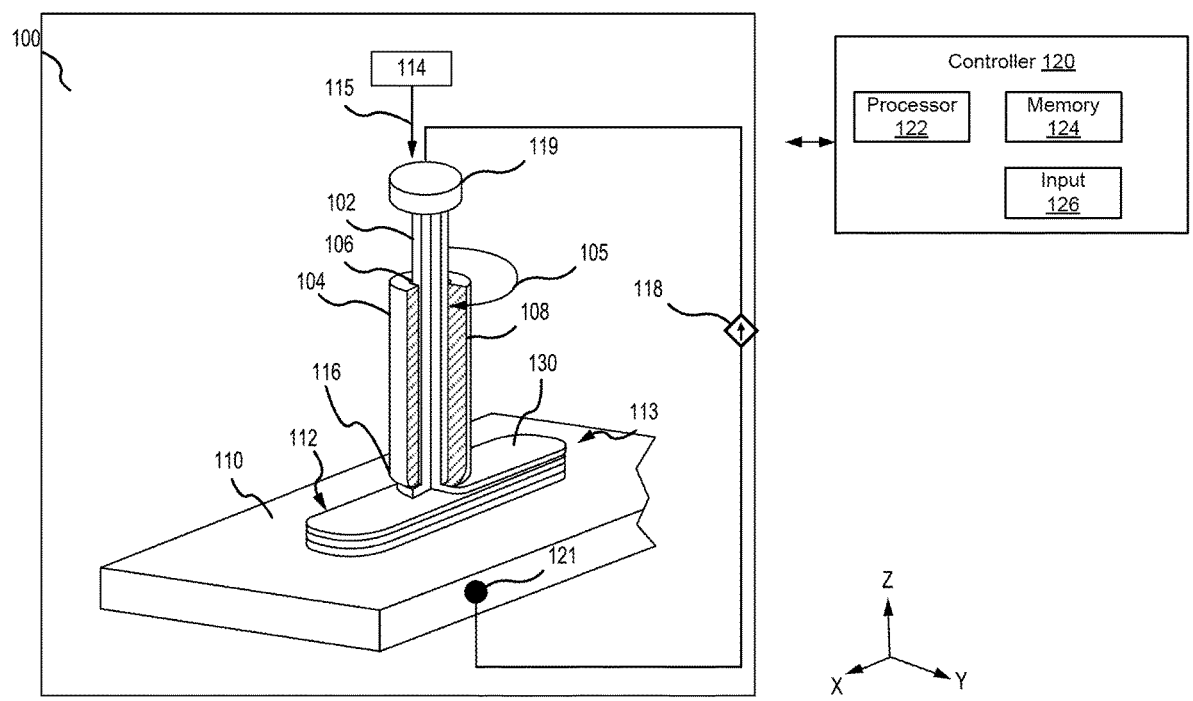
FIG. 1 illustrates a field-assisted friction stir additive manufacturing (FSAM) manufacturing machine, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Friction stir additive manufacturing (FSAM) is a solid-state process in which a feedstock material, inside a hollow rotating tool, is pressed on a substrate or a previous layer formed on the substrate, thereby additively depositing plasticized feedstock material on the substrate or the previous layer of a workpiece. The combined action of rotating speed of the hollow rotating tool and applied vertical axial pressure to the feedstock material generates substantial heat because of friction at the interface between the feedstock and the substrate or a previous layer formed on the substrate. As the feedstock material moves though the hollow rotating tool, the feedstock material undergoes plastic deformation and dynamic recrystallization. While the FSAM process has successfully demonstrated the ability to additively deposit feedstock materials, such as aluminum alloys, there is a concern about depositing stronger feedstock materials, i.e., feedstock material with a hardness above a defined grade, for example greater than aluminum alloys, as per the Mohs Hardness Scale for metals, i.e., materials at or above a 4 hardness (Mohs). The high shear stress and frictional heat induced by the combined action of rotating speed of the hollow rotating tool and applied vertical axial pressure to the feedstock material leads to wear of the rotating tool due to high pressures and/or high heat, among others, as well as contamination coming from material that forms the hollow rotating tool due to high pressures and/or high heat.

Disclosed herein, in various embodiments, is a method of heating the feedstock material during the FSAM process utilizing an electrical current, i.e., a direct electric current or alternating electric current, passing directly through the feedstock material, which is referred to hereafter as field-assisted FSAM. In various embodiments, the heat generated by electric current reduces the vertical (z-direction) axial force needed to plasticize the feedstock material during the additive depositing. In various embodiments, the electroplasticity that occurs because of the applied electrical current and the applied vertical axial pressure provides for the generation of very fine microstructures, i.e. small, uniform particles, in the deposit, which enhances the material mechanical properties further. In various embodiments, the heating the feedstock material during the field-assisted FSAM tends to minimize the vertical axial pressure needed to generate the heat from adiabatic and frictional processes during the rotation of the hollow rotating tool. In various embodiments, the reduced vertical axial pressure tend to minimize the high shear stresses at the deposition interface and hence, reduces and/or eliminates the contamination from material that forms the hollow rotating tool.

Referring now to FIG. 1, a field-assisted friction stir additive manufacturing (FSAM) manufacturing machine 100 is illustrated, in accordance with various embodiments. In various embodiments, a feedstock material 102 may be fed into the field-assisted FSAM manufacturing machine 100. In various embodiments, the feedstock material 102 may be a solid feedstock material or a powder additive feedstock material. In various embodiments, the field-assisted FSAM manufacturing machine 100 includes a hollow rotating tool 104 including an aperture 106 disposed therethrough. In various embodiments, the aperture 106 comprises a cross-sectional profile 108 to receive the feedstock material 102 during a stir friction welding process. In this regard, the feedstock material 102 is fed through the aperture 106 of the hollow rotating tool 104 to facilitate adding additional material to substrate 110 or a respective one of previously laid layers 112 thereby forming a workpiece 113 that is a combination of the substrate 110 and the previously laid layers 112.

In various embodiments, the feedstock material 102 may be loaded in the field-assisted FSAM manufacturing machine 100 configured for the feedstock material 102. The field-assisted FSAM manufacturing machine 100 may include hardware and/or software configured to perform additive manufacturing of an aerospace component. In various embodiments, additive manufacturing may include friction stir welding additive manufacturing. In various embodiments, the field-assisted FSAM manufacturing machine 100 may be configured to deposit plasticized feedstock material 102 on the substrate 110. In various embodiments, the deposition of the plasticized feedstock material 102 on the substrate 110 may be performed in a protective atmosphere, i.e. in a vacuum or using an inter gas shield, among others. In various embodiments, the inter gas may be helium (He) or argon (Ar), among others. In various embodiments, the field-assisted FSAM manufacturing machine 100 may be configured with the hollow rotating tool 104. In various embodiments, the field-assisted FSAM manufacturing machine 100 may incorporate a rod feed system and be capable of delivering the feedstock material 102 at a rate of 0.5 in/min [1.27 cm/min] to 25 in/min [63.5 cm/min] and may have deposition rates between 1 and 20 lbs/hour [0.45 and 9 kg/hr]. In various embodiments, the field-assisted FSAM manufacturing machine 100 may further be configured with force mechanism 114, such as a drive mechanism or press mechanism, among others, to supply a vertical (z-direction) axial force 115 to the feedstock material 102 to cause the feedstock material 102 to translate through the hollow rotating tool 104.

In various embodiments, as the feedstock material 102 is pushed through the aperture 106 of the hollow rotating tool 104 and the hollow rotating tool 104 rotates to provide a rotational force 105, the feedstock material 102 contacts the substrate 110 or the respective one of the previously laid layers 112 which, on contact, causes friction between the feedstock material 102 and the substrate 110 or the respective one of the previously laid layers 112. In that regard, the friction causes the feedstock material 102 to heat to a temperature high enough to plasticize and deposit onto the substrate 110 or the respective one of the previously laid layers 112. In various embodiments, the friction caused by the rotation of the feedstock material 102 and contact of the feedstock material 102 with the substrate 110 or the respective one of the previously laid layers 112 occurs optimally with feedstock materials such as aluminum alloys. However, in various embodiments, feedstock material 102 having a hardness above a defined grade, for example greater than aluminum alloys, as per the Mohs Hardness Scale for metals, requires greater shear stresses and contact temperatures to plasticize such feedstock material. In various embodiments, as a result of those high shear stresses causing a temperature of the working edge 116 of the hollow rotating tool 104 starts to wear and may contaminate the feedstock material 102.

In that regard, the field-assisted FSAM manufacturing machine 100 includes an electric current source 118 of an electrical current circuit that couples to the feedstock material 102 at a first end via electrical contact 119 and to the substrate 110 at a second end via electrical contact 121 such that an electric current passes though the feedstock material 102, the previously laid layers 112, and the substrate 110. In various embodiments, the electric current source 118 is one of direct electrical current or an alternating electrical current. In various embodiments, the electric current source 118 heats the feedstock material 102 to a first temperature. In various embodiments, the first temperature is a temperature close to but not exceeding a temperature that would cause the feedstock material to plasticize and still allow for the rotation of the feedstock material 102 by the hollow rotating tool 104 and the vertical axial force 115 provided by the force mechanism 114. In various embodiments, the first temperature varies based on the hardness of the feedstock material 102, as per the Mohs Hardness Scale for metals. In various embodiments, the friction caused by the combination of the rotation of the hollow rotating tool 104 and the vertical axial force 115 provided by the force mechanism 114 causes the feedstock material 102 to heat to second temperature high enough to plasticize and deposit a current layer 130 onto the substrate 110 or the respective one of the previously laid layers 112. In various embodiments, the second temperature is higher than the first temperature. In various embodiments, the second temperature varies based on the hardness of the feedstock material 102, as per the Mohs Hardness Scale for metals. In that regard, the heat generated by the electric current source 118 reduces the vertical axial force 115 provided by force mechanism 114 needed to plasticize the feedstock material 102 prior to depositing. Also, in various embodiments, the electro-plasticity that occurs because of the electric current source 118, the vertical axial force 115 provided by force mechanism 114, and the rotation of the hollow rotating tool 104 generates very fine microstructures which enhance the deposited materials' mechanical properties.

The field-assisted FSAM manufacturing machine 100 further includes a controller 120 that is in communication with the hollow rotating tool 104, the electric current source 118, and force mechanism 114 and is configured to the hollow rotating tool 104, the electric current source 118, and force mechanism 114. Controller 120 may include one or more processors 122 configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Controller 120 may further include a memory 124 to store data, executable instructions, system program instructions, and/or controller instructions to implement the control logic of controller 120. Memory 124 may further store a database, a look up table, and/or other data objects for use by the executable instructions for implementing the control logic of controller 120. System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Controller 120 may further include an input 126. In various embodiments, input 126 may be a bus or communication protocol with another device. In various embodiments, input 126 may be a touch screen, keyboard, and/or other input device located on the hollow rotating tool 104, the electric current source 118, and force mechanism 114. In various embodiments, input 126 may be a network connection for receiving inputs via a network connected device.

Controller 120 is configured to communicate with and control the hollow rotating tool 104, the electric current source 118, and force mechanism 114. Controller 120 may send instructions to the hollow rotating tool 104, the electric current source 118, and force mechanism 114 to control the working parameters of the hollow rotating tool 104, the electric current source 118, and force mechanism 114. In various embodiments, the instructions may be stored in memory 124 as a computer numerical control (CNC) program. The working parameters may include the RPM, the axial speed, the axial force, the radial speed, and the electric current applied to the feedstock material 102. In various embodiments, the RPM may soften the material of the feedstock material 102 allowing material to deposit on the substrate 110 or the respective one of the previously laid layers 112. In various embodiments, the working parameters may be received via input 126. In various embodiments, the working parameters may be derived from input received via input 126. For example, input 126 may receive a type of metal of the feedstock material 102 and/or a diameter of the feedstock material 102, among other input information.

In various embodiments, controller 120 may use the input information to determine the working parameters to send to the hollow rotating tool 104, the electric current source 118, and force mechanism 114. In various embodiments, controller 120, and, more specifically, memory 124, may store a database of working parameters for different material types and diameters. For example, controller 120 may send a first set of working parameters to the hollow rotating tool 104, the electric current source 118, and force mechanism 114 in response to the input indicating that the feedstock material 102 is formed from a first alloy having a first diameter. As another example, controller 120 may send a second set of working parameters, with at least one parameter being different, to the hollow rotating tool 104, the electric current source 118, and force mechanism 114 in response to the input indicating that the diameter of the feedstock material 102 is a second diameter that is different than the first diameter.

By adjusting the working parameters (e.g., RPM, axial speed, axial force, radial speed, electric current, etc.) for different materials and sized materials, controller 120, the hollow rotating tool 104, the electric current source 118, and force mechanism 114 may deposit plasticized material having different thicknesses which improves the quality of the workpiece while reducing the cost of the workpiece. Adjusting the working parameters of the hollow rotating tool 104, the electric current source 118, and force mechanism 114 by the controller 120 allows for a uniform and consistent workpiece. Additionally, each layer of the workpiece may be controlled to be a precise thickness to avoid material waste associated with forming a thick workpiece and machining the workpiece to a thinner, desired, thickness. The feedstock material 102 is preheated by the electric current and further heated by friction between the feedstock material 102 and the workpiece causing the feedstock material 102 to adhere to the workpiece. Additional machining (e.g., grinding, sanding, etc.) may be performed to reduce the layer to the desired thickness.

Referring now to FIGS. 2A-2D, illustrated is a process 200 of forming a metal workpiece 202, in accordance with various embodiments. The metal workpiece 202 may be an example of workpiece 113 described above with respect to FIG. 1. Process 200 may be performed on a field-assisted FSAM manufacturing machine such as field-assisted FSAM manufacturing machine 100 described above. In various embodiments, the layers on the metal workpiece 202 may include a single layer. In various embodiment, the layers on the metal workpiece 202 may include more than one layer. In various embodiments, each layer may be formed from the same material or different materials. Process 200 is described herein as including four layers for description purposes. However, it should be understood that process 200 may be used form any number of coating layers.

Figure 2A:
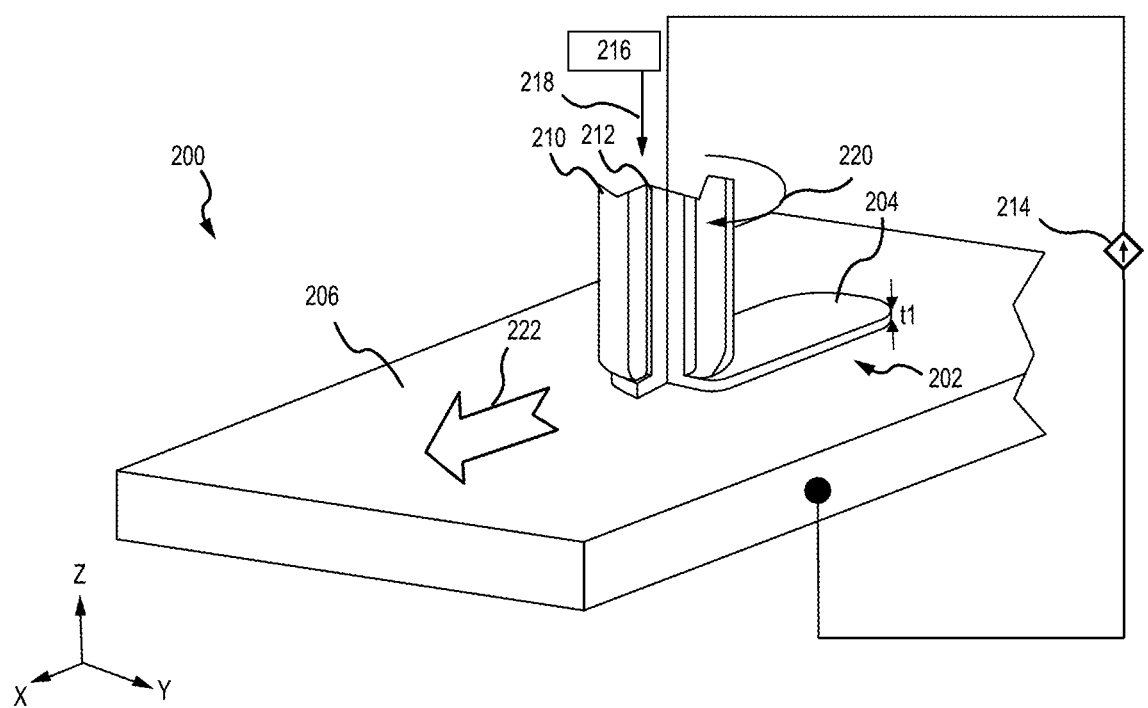
FIGS. 2A, 2B, 2C, and 2D illustrate a process of forming a metal workpiece, in accordance with various embodiments.

FIG. 2A illustrates a first step of process 200 where a metal workpiece 202 receives a first layer 204 via a first deposition process. The metal workpiece 202 may be made from a first type of metal. In various embodiments, the first type of metal may be a steel alloy or tungsten, among others, or any alloy of metal, such as the Ti-8V-5Fe-1Al (Ti185) alloy. The first layer 204 may be made from the same metal as substrate 206 or a different type of metal. In various embodiments, first layer 204 may be more active than the metal workpiece 202. As used herein, more active may define electrochemical behavior and/or corrosion rate of first layer 204 as compared to the metal workpiece 202. In various embodiments, a hollow rotating tool 210 receives and supports a feedstock material 212. The feedstock material 212 may be an example of the feedstock material 102 described above with respect to FIG. 1. In various embodiments, the feedstock material 212 may be made from a harder metal alloy, such as steel or tungsten, among others. In various embodiments, a first connection of an electric current source 214 is coupled to proximal end of the feedstock material 212 and a second connection of the electric current source 214 is coupled to the substrate 206. In that regard, an electric current is passed though the feedstock material 212 and the substrate 206 thereby heating the feedstock material 102. The heat generated by the electric current source 214 reduces the vertical axial force needed to plasticize the feedstock material 212 prior to depositing.

In various embodiments, a force mechanism 216 provides a vertical axial force 218 (e.g., in the negative z-direction) on the feedstock material 212. The vertical axial force 218 on the feedstock material 212 creates friction between the feedstock material 212 and the metal workpiece 202. The hollow rotating tool 210 provides a rotational force 220 (e.g., in either a clockwise direction or a counterclockwise direction) on the feedstock material 212. The rotational force 220 provides additional friction between the feedstock material 212 and the metal workpiece 202. The friction between the feedstock material 212 and the metal workpiece 202 softens the feedstock material 212 so as to plasticize the feedstock material 212 thereby adding a layer to of the plasticized feedstock material on the metal workpiece 202. The hollow rotating tool 210 applies a radial force 222 in a radial direction (e.g., in the x-direction) to the feedstock material 212. The first layer 204 indicates a layer of material deposited on the metal workpiece 202 during a pass in the radial direction. The radial force 222 determines a speed at which the feedstock material 212 passes over the metal workpiece 202 and a first thickness t1 of the first layer 204.

Figure 2B:
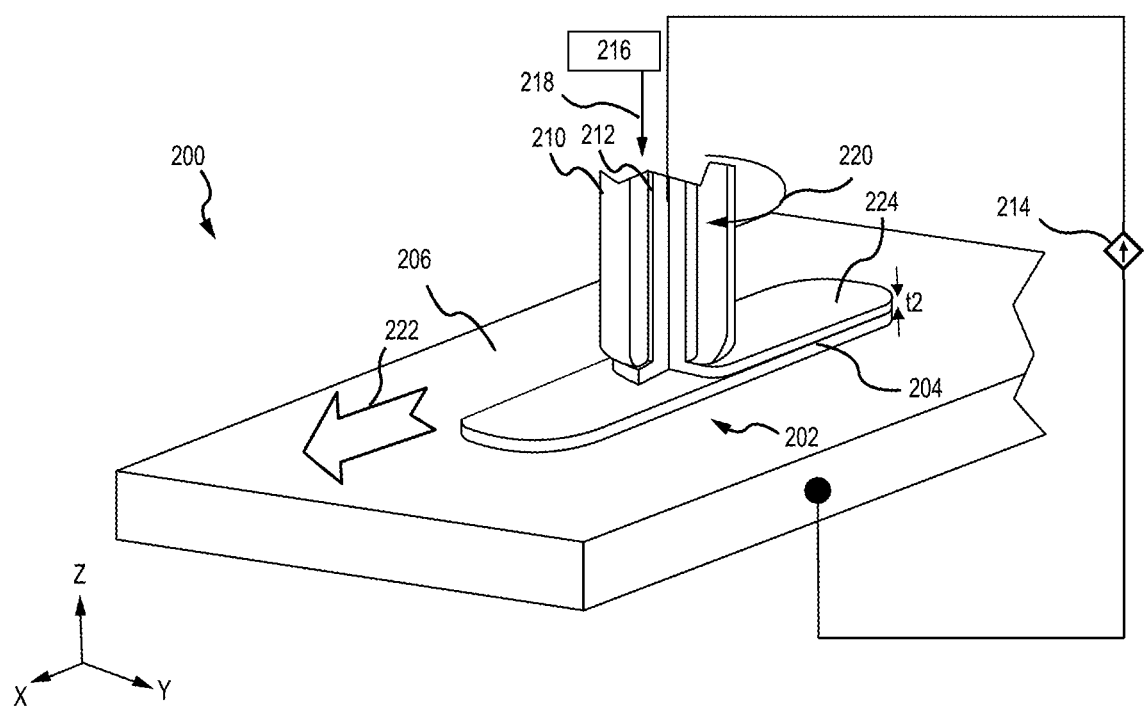

Referring now to FIG. 2B, the process 200 may continue by depositing a second layer 224 on the first layer 204 via a second deposition process. The second layer 224 is deposited by the same process as the first layer 204. The second layer 224 has a second thickness t2. In various embodiments, the second thickness t2 may be the same as the first thickness t1. In various embodiments, the second thickness t2 may be greater than or less than the first thickness t1. The second layer 224 indicates a layer of material deposited on the first layer 204 during a pass in the radial direction.

Figure 2C:
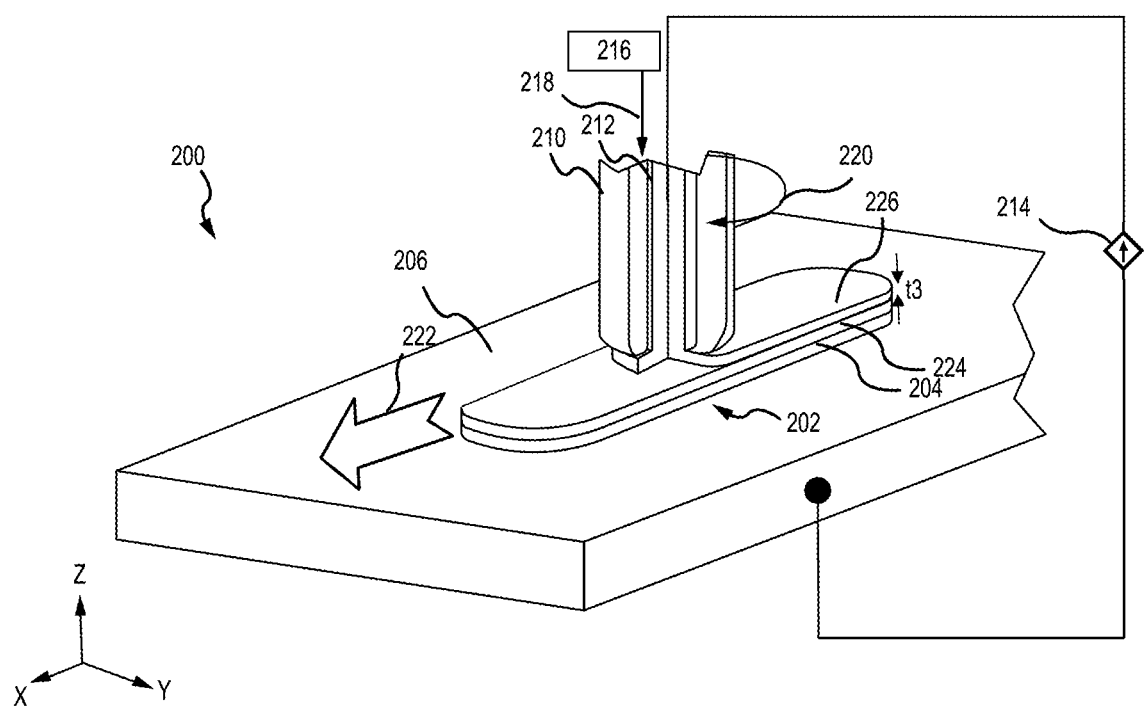

Referring now to FIG. 2C, the process 200 may continue by depositing a third layer 226 on the second layer 224 via a third deposition process. The third layer 226 is deposited by the same process as the first layer 204 and the second layer 224. The third layer 226 has a third thickness t3. In various embodiments, the third thickness t3 may be the same as the first thickness t1 and the second thickness t2. In various embodiments, each of the first thickness t1, the second thickness t2, and the third thickness t3 may be the different than each of the other thicknesses t1, t2, and t3. The third layer 226 indicates a layer of material deposited on the second layer 224 during a pass in the radial direction.

Figure 2D:
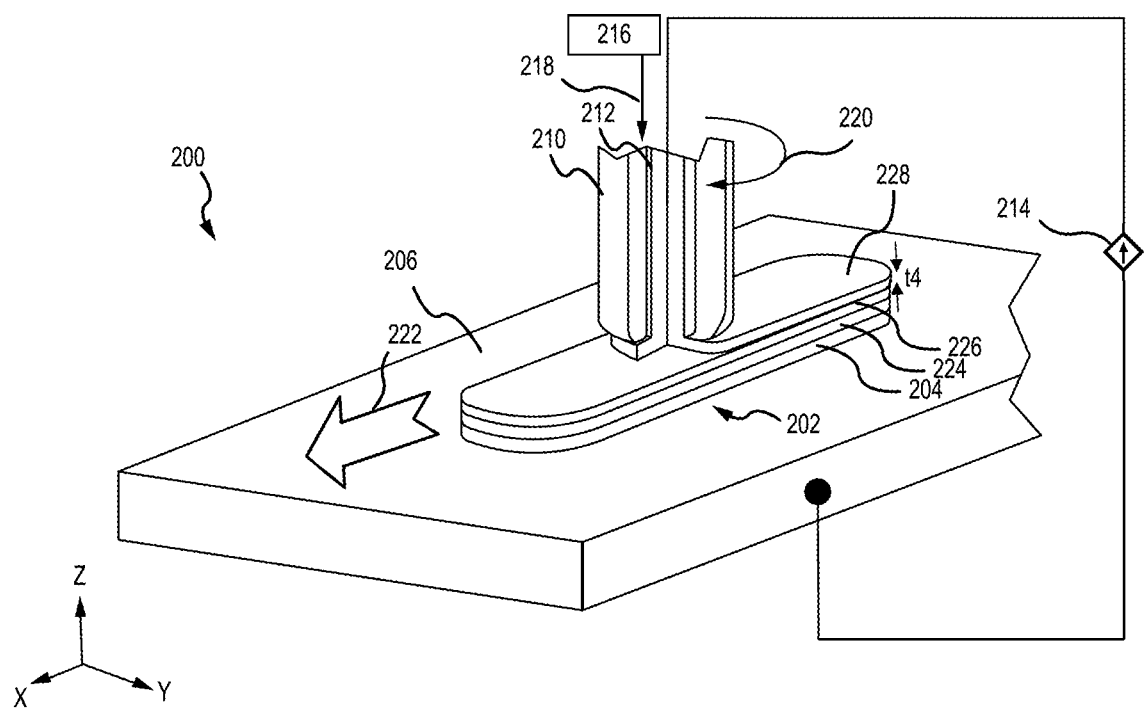

Referring now to FIG. 2D, the process 200 may continue by depositing a fourth layer 228 on the third layer 226 via a fourth deposition process. The fourth layer 228 is deposited by the same process as the first layer 204, the second layer 224, and the third layer 226. The fourth layer 228 has a fourth thickness t4. In various embodiments, the fourth thickness t4 may be the same as the first thickness t1, the second thickness t2, and the third thickness t3. In various embodiments, each of the first thickness t1, the second thickness t2, the third thickness t3, and the fourth thickness t4 may be the different than each of the other thicknesses t1, t2, t3, and t4. The fourth layer 228 indicates a layer of material deposited on the third layer 226 during a pass in the radial direction.

Figure 3:
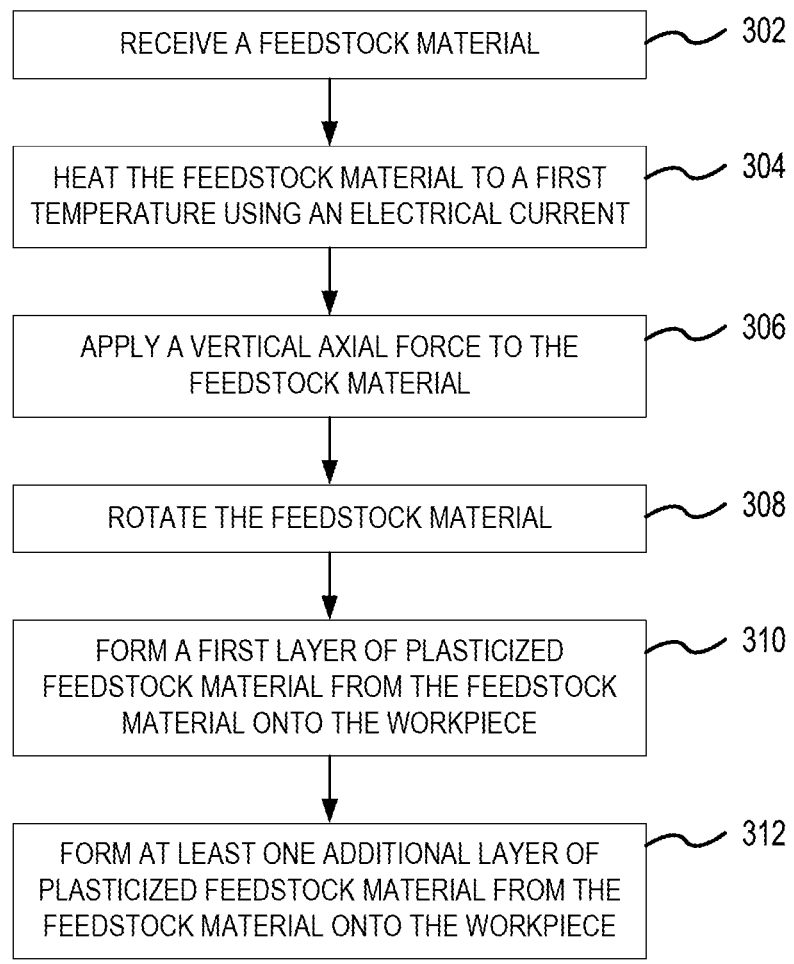
FIG. 3 illustrates a flow diagram of a method of forming a metal workpiece, in accordance with various embodiments.

Referring now to FIG. 3, a flow diagram of a method 300 for forming a metal workpiece is illustrated in accordance with various embodiments. At block 302, a field-assisted FSAM manufacturing machine receives a feedstock material. At block 304, the field-assisted FSAM manufacturing machine heats the feedstock material to a first temperature using an electrical current. At block 306, the field-assisted FSAM manufacturing machine applies a vertical axial force to the feedstock material. At block 308, the field-assisted FSAM manufacturing machine rotates the feedstock material. At block 310, the field-assisted FSAM manufacturing machine forms a first layer of plasticized feedstock material from the feedstock material onto the workpiece, the first layer having a first thickness. At block 312, the field-assisted FSAM manufacturing machine forms at least one additional layer of plasticized feedstock material from the feedstock material onto the workpiece, the at least one additional layer having a respective thickness.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for forming a metal workpiece, comprising:
   applying an electrical current to a feedstock material;
   applying a vertical axial force to a first end of the feedstock material, wherein the axial force is provided via a press mechanism;
   applying a rotational force to the feedstock material; and
   producing a metallic component from a second end of the feedstock material based on the electrical current, the vertical axial force, and the rotational force,
   wherein a first end of an electrical current circuit supplying the electrical current is applied to the first end of the feedstock material and a second end of the electrical current circuit is applied to a substrate.

2. The method of claim 1, wherein the electrical current is at least one of a direct electrical current or an alternating electrical current.

3. The method of claim 1, wherein the substrate is comprised of a first material and the feedstock material is comprised of a second material and wherein the first material is the same as the second material.

4. The method of claim 1, wherein the substrate is comprised of a first material and the feedstock material is comprised of a second material and wherein the first material is different material than the second material.

5. The method of claim 1, wherein the feedstock material is a metal alloy with a hardness at or above a 4 hardness (Mohs).

6. The method of claim 1, wherein producing the metallic component from the feedstock material further comprises:
   preforming a first deposition process to form a first layer on a substrate; and
   preforming a second deposition process to form a second layer over the first layer.

7. The method of claim 6, wherein the first layer is formed to a first thickness and the second layer is formed to a second thickness.

8. The method of claim 6, wherein the first deposition process is a stir friction welding process.

9. A system, comprising:
   an electric current source;
   a force mechanism;
   a rotating tool;
   a controller; and
   a tangible, non-transitory memory configured to communicate with the controller, the tangible, non-transitory memory having instructions stored thereon that, in response to execution by the controller, cause the controller to perform operations comprising:

commanding the electric current source to apply an electrical current to a feedstock material;

commanding the force mechanism to apply a vertical axial force to a first end of the feedstock material, wherein the axial force is provided via a press mechanism;

commanding the rotating tool to apply a rotational force to the feedstock material; and producing a metallic component from a second end of the feedstock material based on the electrical current, the vertical axial force, and the rotational force, wherein a first end of an electrical current circuit supplying the electrical current from the electric current source is applied to the first end of the feedstock material and a second end of the electrical current circuit is applied to a substrate on which the metallic component is produced.

10. The system of claim 9, wherein the electrical current is at least one of a direct electrical current or an alternating electrical current.

11. The system of claim 9, wherein the substrate is comprised of a first material and the feedstock material is comprised of a second material and wherein the first material is the same as the second material.

12. The system of claim 9, wherein the substrate is comprised of a first material and the feedstock material is comprised of a second material and wherein the first material is different material than the second material.

13. The system of claim 9, wherein the feedstock material is a metal alloy with a hardness at or above a 4 hardness (Mohs).

14. A method of forming a metal workpiece, comprising:
receiving a feedstock material comprising a first material;

applying an electrical current to the feedstock material to heat the feedstock material to a first temperature;

applying a vertical axial force to a first end of the feedstock material, wherein the axial force is provided via a press mechanism;

applying a rotational force to the feedstock material, wherein an application of the vertical axial force and the rotational force causes a second end of the feedstock material to heat to a second temperature, wherein the second temperature is higher than the first temperature; and producing a metallic component from the second end the feedstock material, wherein a first end of an electrical current circuit supplying the electrical current from an electric current source is applied to the first end of the feedstock material and a second end of the electrical current circuit is applied to a substrate on which the metallic component is produced.

15. The method of claim 14, wherein the electrical current is at least one of a direct electrical current or an alternating electrical current.

16. The method of claim 14, wherein the substrate is comprised of a second material and wherein the first material is the same as the second material.

17. The method of claim 14, wherein the substrate is comprised of a second material and wherein the first material is different material than the second material.

* * * * *